US012680649B2

(12) United States Patent
Mercer et al.

(10) Patent No.: US 12,680,649 B2
(45) Date of Patent: Jul. 14, 2026

(54) POD HANGER FOR SUBSURFACE GAS STORAGE

(71) Applicants: Michael D. Mercer, Edmond, OK (US); Ronald R. Mercer, Edmond, OK (US)

(72) Inventors: Michael D. Mercer, Edmond, OK (US); Ronald R. Mercer, Edmond, OK (US)

( * ) Notice: Subject to any disclaimer, the term of this patent is extended or adjusted under 35 U.S.C. 154(b) by 141 days.

(21) Appl. No.: 18/658,280

(22) Filed: May 8, 2024

(65) Prior Publication Data

US 2024/0377029 A1 Nov. 14, 2024

Related U.S. Application Data

(60) Provisional application No. 63/464,643, filed on May 8, 2023.

(51) Int. Cl.
*F17C 1/00* (2006.01)
*E21B 33/04* (2006.01)

(52) U.S. Cl.
CPC .............. *F17C 1/007* (2013.01); *E21B 33/04* (2013.01); *F17C 2203/014* (2013.01); *F17C 2221/012* (2013.01); *F17C 2221/033* (2013.01)

(58) Field of Classification Search
CPC ................ F17C 1/007; F17C 2221/033; F17C 2221/012; F17C 2203/014; E21B 33/04; B65G 5/00
See application file for complete search history.

(56) References Cited

U.S. PATENT DOCUMENTS

| | | | | |
|---|---|---|---|---|
| 3,196,622 A | | 7/1965 | Smith et al. | |
| 4,247,220 A | | 1/1981 | Furman | |
| 5,207,530 A | * | 5/1993 | Brooks | F17C 1/007 405/53 |
| 5,333,465 A | * | 8/1994 | McBride | F17C 1/007 137/264 |
| 6,398,055 B1 | * | 6/2002 | Ostholt | F17C 1/00 220/4.12 |

(Continued)

FOREIGN PATENT DOCUMENTS

| | | | |
|---|---|---|---|
| CN | 202915039 | * | 5/2013 |
| WO | 2023/209079 A1 | | 11/2023 |

*Primary Examiner* — Carib A Oquendo
(74) *Attorney, Agent, or Firm* — Hall Estill Law Firm

(57) ABSTRACT

Apparatus for the subsurface storage of one or more pressurized gases such as hydrogen, compressed natural gas, etc. A subsurface storage pod includes a pod hanger support plate configured to span an opening of a well bore that extends into a subsurface formation. The support plate includes an upper plate with storage container apertures extending therethrough, a lower plate configured to be supported by a support pad that surrounds the well bore opening, and at least one support flange that extends between and interconnects the upper and lower plates. Gas storage containers extend through the storage container apertures and into the well bore. A vent aperture allows flow of gases from within the well bore to the surrounding environment. The support flanges may be arranged as interlocking members in a crossing pattern, and the lower plate can be arranged as discontinuous segments installed between adjacent pairs of the interlocking members.

20 Claims, 11 Drawing Sheets

(56) References Cited

U.S. PATENT DOCUMENTS

| | | | | |
|---|---|---|---|---|
| 7,068,748 | B2 * | 6/2006 | Singh | G21F 9/36<br>250/506.1 |
| 8,660,230 | B2 * | 2/2014 | Singh | B66C 19/00<br>250/507.1 |
| 9,109,751 | B2 * | 8/2015 | Schimp | F17C 5/06 |
| 10,337,669 | B2 | 7/2019 | Mercer et al. | |
| 10,837,601 | B2 | 11/2020 | Mercer et al. | |
| 11,680,684 | B2 | 6/2023 | Mercer et al. | |
| 11,885,970 | B2 | 1/2024 | Wright et al. | |
| 11,927,144 | B2 | 3/2024 | Mercer et al. | |
| 2007/0267418 | A1 * | 11/2007 | Takai | E03B 3/03<br>220/567.1 |
| 2020/0132250 | A1 * | 4/2020 | Mercer | F17C 1/007 |
| 2022/0034448 | A1 * | 2/2022 | Meheen | B65G 5/00 |
| 2023/0250923 | A1 | 8/2023 | Mercer et al. | |
| 2025/0327548 | A1 * | 10/2025 | Martin | F17C 1/007 |

* cited by examiner

POD HANGER FOR SUBSURFACE GAS STORAGE

RELATED APPLICATIONS

The present application makes a claim of domestic priority under 35 U.S.C. 119(e) to U.S. Provisional Patent Application No. 63/464,643 filed May 8, 2023, the contents of which are hereby incorporated by reference.

BACKGROUND

Subsurface storage containers can be used to store high pressure gas, such as hydrogen or compressed natural gas, in an efficient and safe manner. Such systems often utilize elongated storage containers with a casing (e.g., one or more cylindrical steel housings) capped at each end to provide an interior storage space for the stored pressurized gas. The storage containers can be lowered into a well bore that extends into a subterranean formation. To accommodate the large storage pressures that are often used in such systems, some configurations backfill the well bore with concrete or other support material to cement the storage containers into place.

While operable, there remains a continued need for improvements in the manner in which storage arrays of containers are configured to facilitate installation, servicing, upgrades and remediation. It is to these and other improvements that various embodiments are directed.

SUMMARY

Various embodiments of the present disclosure are generally directed to the subsurface storage of pressurized gases.

Without limitation, some embodiments provide a subsurface storage pod that includes a pod hanger support plate configured to span an opening of a well bore that extends into a subsurface formation. The support plate includes an upper plate with storage container apertures extending therethrough, a lower plate configured to be supported by a support pad that surrounds the well bore opening, and at least one support flange that extends between and interconnects the upper and lower plates. Gas storage containers extend through the storage container apertures and into the well bore.

In further embodiments, a vent channel can be used to allow a flow of gases from within the well bore to the surrounding environment. The support flanges may be arranged as interlocking members in a crossing pattern, and the lower plate can be arranged as discontinuous segments installed between adjacent pairs of the interlocking members. Annular support bushings can be used to surround the storage container apertures and contactingly support the storage containers. Securement mechanisms can be used to secure the storage containers to the upper plate. An intermediate support plate can be used to support the storage containers during transportation, installation and/or use.

These and other features and advantages of various embodiments can be understood from a review of the following detailed description in conjunction with the accompanying drawings.

DETAILED DESCRIPTION

Figure 1A:
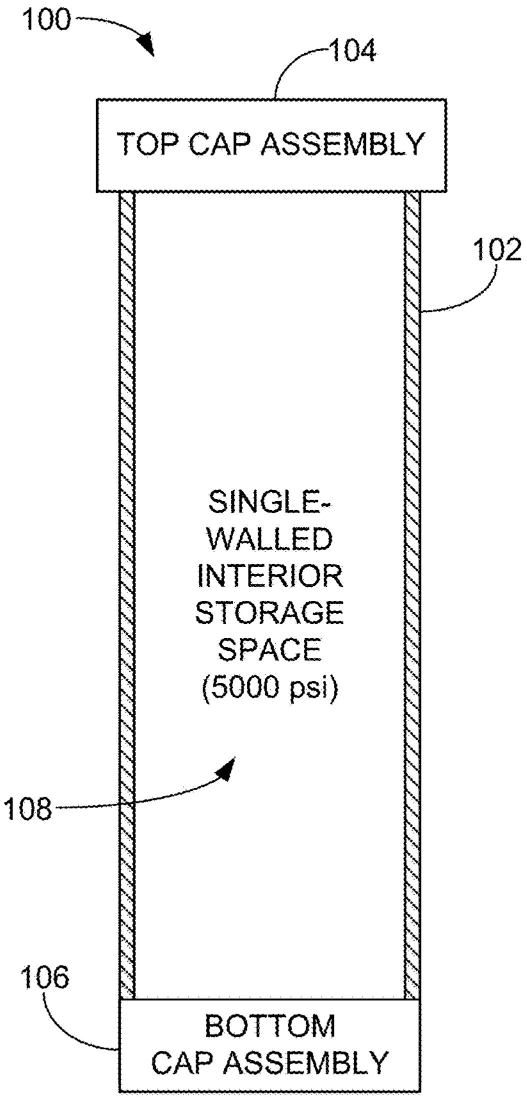
FIG. 1A is a schematic depiction of a single-walled storage container constructed and operated in accordance with some embodiments of the present disclosure.

Various embodiments of the present disclosure are generally directed to a method and apparatus for the subsurface storage of pressurized gas through the use of a pod hanger configuration. As explained below, a subsurface storage pod assembly ("storage pod") includes a plurality of storage containers that are supported by a support plate ("pod hanger") to extend into a well bore that extends downwardly into a subsurface (below ground) formation.

The storage containers, also sometimes referred to as storage modules, may be formed of steel casing or similar elements with cap assemblies supplied at each end to provide an interior storage space adapted to store pressurized gas at a high pressure. Appropriate compressors, valves, ports, conduit hoses, meters, sensors and other instrumentation and control elements are provided to enable the pressurized gas to be introduced into the storage containers, and withdrawn therefrom, as required.

In at least some embodiments, the storage plate has horizontally extending upper and lower plates separated by a plurality of intervening, vertically extending support flanges. The plate assembly spans the opening of the bore, and the upper plate contactingly supports the storage containers which extend through the upper plate, adjacent the support flanges, and through or adjacent the lower plate.

Ventilation apertures extend through the respective upper and lower plates to accommodate airflow and the passage of fumes or other gases in the event of a leak from the system. Securement mechanisms such as brackets are used to attach the upper portions of the storage containers to the upper plate.

Any number of different types and varieties of gases may be stored by the storage containers. Without limitation, some embodiments store high pressurized hydrogen (H2), compressed natural gas (CNG), methane (CH4), oxygen (O2), and/or other gases as required. Operational pressure ranges can vary as required, with some embodiments storing the gasses from around 4000 pounds per square inch (psi) to upwards of 12,000 psi or more. Other ranges can be used. The storage containers can take a variety of constructions, including but not limited to single-walled and double-walled constructions.

The containers are supported by the support plate to form a pod or array of containers. Any number of containers can be utilized in a given storage pod, and each of the containers can store the same type of gas, or different containers within the same pod can store different gases.

In some embodiments, the storage containers are configured to be individually lowered and raised from the support plate, enabling the individual containers to be removed and replaced as required. In other embodiments, an entire storage pod can be lowered or raised during installation and removal. In each case, the containers are configured to be sufficiently reinforced and rigid to contain the internally stored gases without the need for backfilling of the well bore with concrete or other support material.

In further embodiments, a second support plate assembly is provided to support lower portions of the storage container during transportation and installation. The second support plate can be removed prior to lowering the individual storage containers into the pod, or can remain in place if the pod is installed as a unit.

These and other features and advantages of various embodiments can be understood beginning with a review of FIG. 1A which provides a storage container 100 adapted to store a pressurized gas. The container 100 is characterized as a single walled container with a cylindrically shaped outer casing 102, a top cap assembly 104 and a bottom (lower) cap assembly 106. These elements can take various forms and material constructions.

In one embodiment, the casing 102 is steel and has an outermost diameter (OD) of about 13 inches, in. The bottom cap assembly 106 may be sized to be aligned with the OD of the casing 102, and the top cap assembly 104 may be sized to have a larger OD than the casing, such as about 16 in. Other sizes and configurations can be used, including top and bottom cap assemblies with the same ODs, top and bottom cap assemblies that have nominally the same OD as the casing, etc. In some cases, the casing can be a unitary extent of cylindrical piping, or can be formed from multiple such extents joined together with intervening connection joints (not separately shown).

The container 100 provides an interior storage space 108 adapted to store pressurized gas at up to a selected pressure. In one example, the container 100 is adapted to store CNG at an internal pressure of up to about 5,000 psi. This is merely exemplary and is not limiting, as other gases and pressures can be used depending on the construction and operation of the container.

Figure 1B:
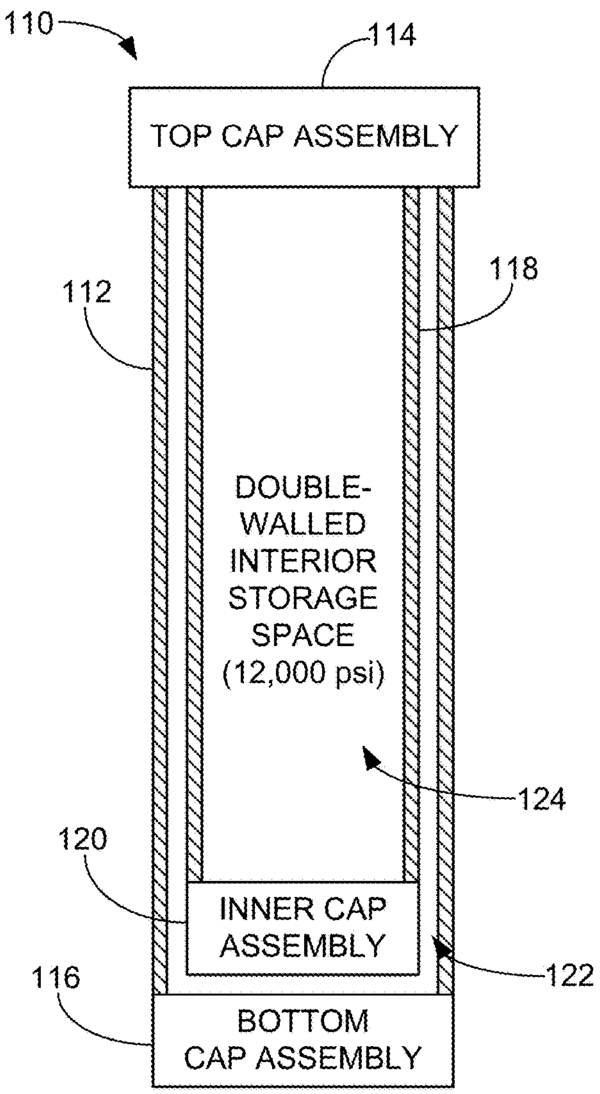
FIG. 1B is a schematic depiction of a double-walled storage container constructed and operated in accordance with further embodiments of the present disclosure.

FIG. 1B shows a second storage container 110 similar to the container 100 in FIG. 1. In this case, the container 110 is characterized as a double-walled container with an outer casing 112, top cap assembly 114, bottom cap assembly 116, inner liner 118, inner cap assembly 120, and annulus (separation space) 122 between the inner liner 118 and outer casing 112. As before, the respective casing 112 and inner liner 118 may be formed of steel or other suitable materials, and the outer casing 112 may have the same nominal OD as the casing 102 in FIG. 1.

This double wall configuration defines an interior storage space 124 for the storage of high-pressure gas. A fluid such as a non-compressible liquid can be placed into the annulus 122 to enable transfer of pressure from the interior storage space 124 to the outer casing 112. A suitable non-compressible fluid is propylene glycol, although other liquids can be utilized as desired. Corrosion inhibitors and gas reactive additives can be supplied in the fluid as desired. In this example, the interior storage space 124 is configured to store hydrogen (H2) at an operational pressure of up to about 12,000 psi. As before, other gases and pressures can be utilized as desired.

Both of the storage containers 100, 110 are provided with suitable ports (not separately shown) as part of the associated cap assemblies 104, 114 to allow the introduction (supply) and withdrawal (delivery) of the associated gasses stored by the respective containers.

Figure 2:
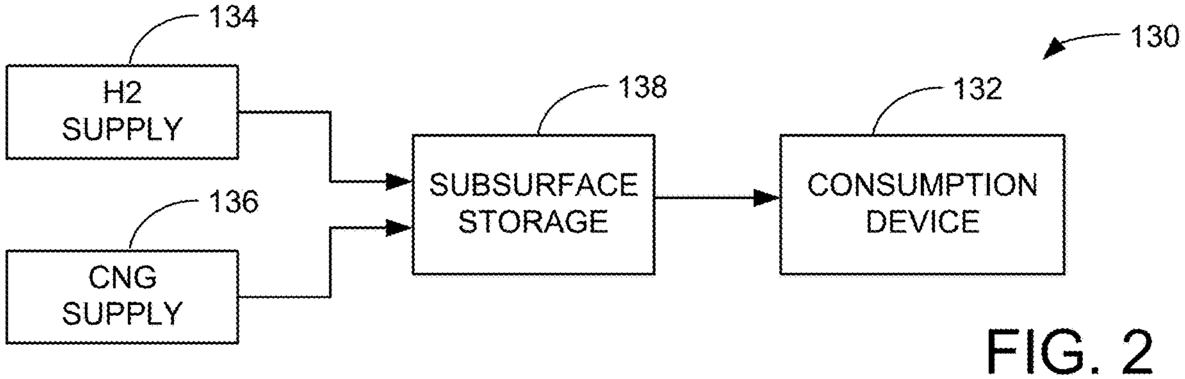
FIG. 2 depicts a subsurface gas storage and delivery system that utilizes the various storage systems of FIGS. 1A-1B in accordance with some embodiments to supply a flow of pressurized gas to a consumption device.

FIG. 2 shows a subsurface gas storage and delivery system 130 that utilizes the various storage containers 100, 110 of FIGS. 1A-1B in accordance with some embodiments to supply a flow of pressurized gas to a consumption device 132.

The consumption device 132 can be any number of systems adapted to utilize a controlled flow of pressurized gas such as a gas-fueled burner, a fuel cell, an internal combustion engine (ICE), a gas turbine, etc. The consumption device 132 may be stationary, such as in the case of a power plant, or may be moveable, such as via a motor vehicle. Different constituent gases or blends thereof at different flow rates and delivery pressures can be provided based on the requirements of a given application.

In the example in FIG. 2, H2 is supplied by an H2 source 134 and CNG is supplied by a CNG source 136. The H2 source 134 may be an on-site installation where renewable energy (solar, wind, etc.) is used to power an electrolyzer to generate a stream of H2. The CNG source 136 may be a pipeline or other source of CNG. Other configurations can be used.

A subsurface storage system 138 provides subsurface storage of the supplied gases prior to delivery to the consumption device 132. In some embodiments, the system 138 takes the form of a pod farm having an array of storage pods. The system is modular so that additional pods can be added to the array as required to expand the total storage capabilities of the system. In some cases, the pod farm stores only a single type of gas (e.g., H2, CNG, or some other gas). In other cases, the pod farm can be arranged such that a first number of pods/containers store a first gas, another number of pods/containers store a second gas, and so on.

Figure 3:
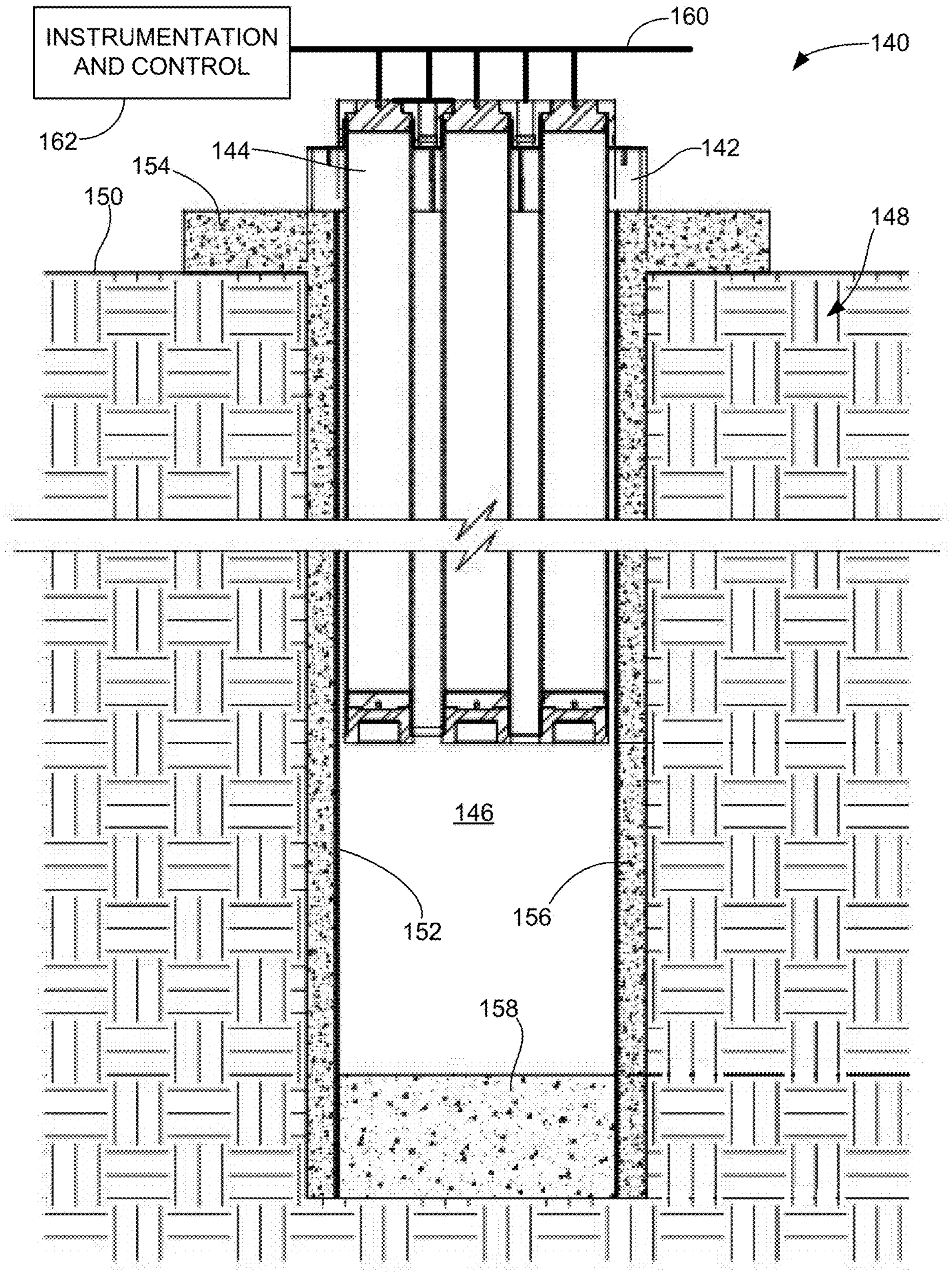
FIG. 3 shows aspects of a subsurface storage pod assembly constructed and operated in accordance with various embodiments.

FIG. 3 shows aspects of an installed storage pod 140 that can be used as part of the storage system 138 in FIG. 2. The pod 140 includes a storage pod support plate assembly 142 (hereinafter "storage plate") which supports a number of storage containers 144. The storage containers 144 extend downwardly into a bore 146 (caisson, well bore, etc.) formed in a subsurface formation 148 from near a surface level 150.

In some cases, a liner 152 such as a corrugated conduit is inserted into the bore 146, and concrete is poured to form an upper support pad 154, sidewalls 156 and lower interior plug 158. Suitable piping conduits 160 and instrumentation and control elements 162 are installed as required to control the flow of the gases into and out of the containers 144. While not limiting, the bore 146 may be on the order of about five feet (5 ft.) in diameter and about 50 ft. in depth. Each container 144 is on the order of about 42 ft. in length and about 13 in. in diameter. The support plate 142 is about six (6) ft. in diameter. Other sizes and configurations can be used.

Figure 4:
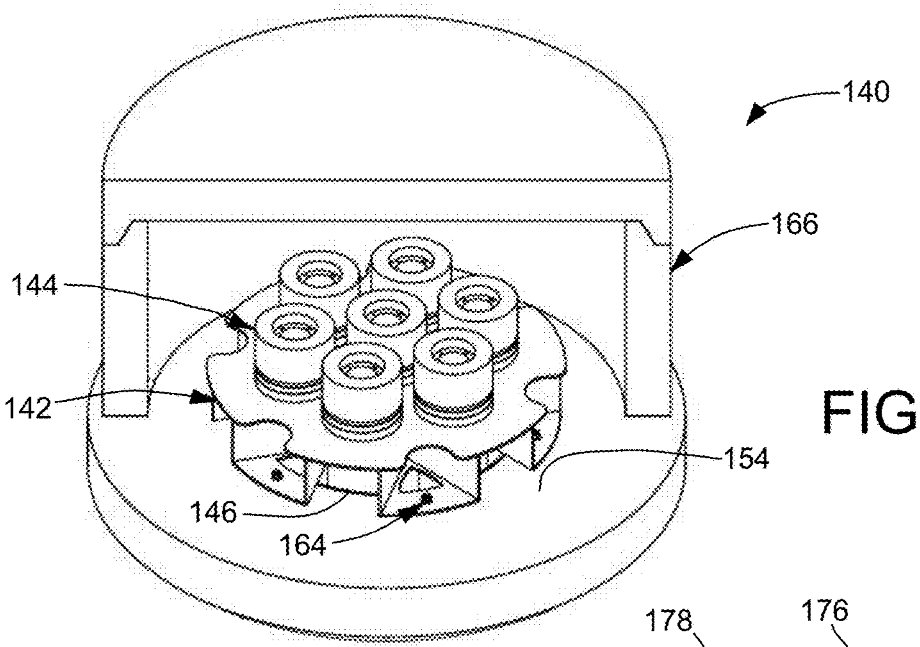
FIG. 4 is a cut/away, isometric depiction of aspects of the storage pod assembly of FIG. 3.

FIG. 4 shows aspects of the storage pod 140 from FIG. 3 in accordance with further embodiments. Other configurations can be used. In FIG. 4, a total of seven (7) storage containers 144 are used in the pod 140 in a hexagonal (honeycomb) arrangement. The upper support pad 154 is annular in shape to surround the bore 146 as shown.

The support plate 142 is contactingly supported by the pad 154 to span the bore opening, and is secured to the pad using fasteners 164. As desired, a housing 166 such as formed of concrete or similar may be erected to provide environmental protection and security for upper portions of the pod 140. Other features such as plumbing, piping and drainage conduits can be included but have been omitted for simplicity of illustration.

Figure 5A:
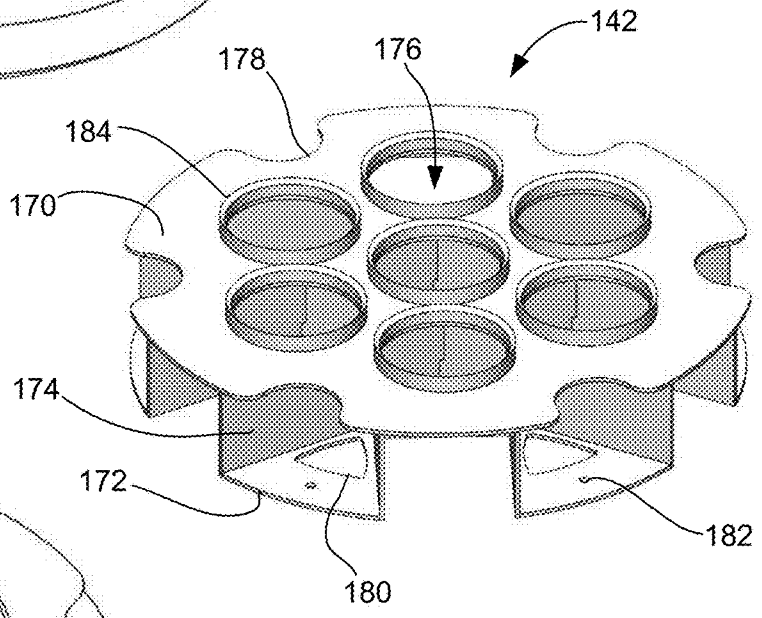
FIGS. 5A and 5B show respective isometric and top plan views of a storage pod support plate that can be incorporated into the installation of FIGS. 4-5 in some embodiments.
Figure 5B:
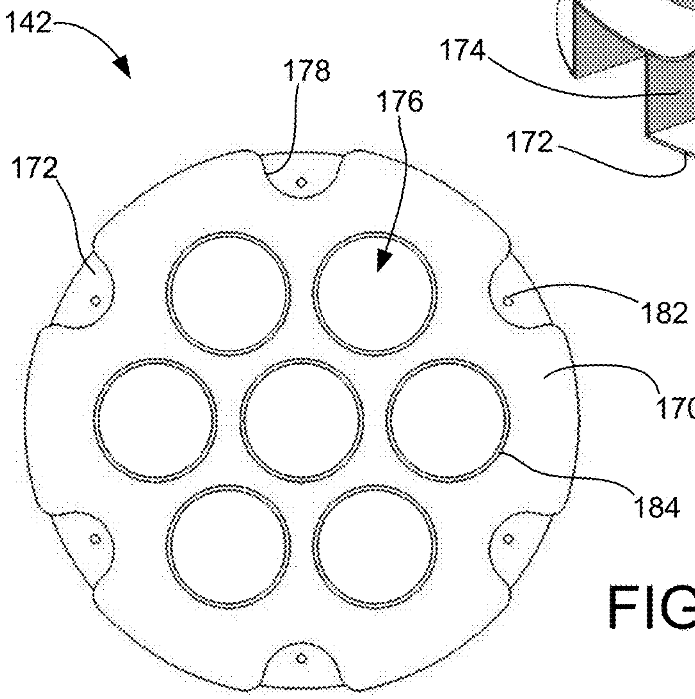

FIGS. 5A and 5B show the support plate 142 in further detail. FIG. 5A is an isometric depiction and FIG. 5B is a top plan view. As described in greater detail below, the support plate 142 includes an upper plate 170, a lower plate 172 and a number of intervening support flanges 174.

While not limiting, the upper plate 170 may be formed as a continuous web of material of uniform thickness. Various cutouts extend through the thickness of the plate material including storage container openings 176 and side vent apertures 178. The lower plate 172 may be segmented into various individual discontinuous pieces as shown, or can be formed as a single continuous web of material similar to the upper plate 170.

The lower plate 172 also includes various cutouts including interior vent apertures 180 and fastener openings 182. The vent apertures 180 provide a venting path in conjunction with the vent apertures 178 of the upper plate 170. The openings 182 accommodate the fasteners 164 (see FIG. 4) to secure the support plate 142 to the pad 154.

The support flanges 174, also referred to as interlocking support members, are sized to pass between the openings 178 and interconnect the upper and lower plates 170, 172 in an I-beam or C-beam fashion. As desired, annular support bushings 184 can be optionally attached to the upper plate 170 to surround each of the container openings 176 and contactingly support each of the respective containers.

Each of the upper and lower plates 170, 172 and the support flanges 174 may be formed of plate steel, such as on the order of ½ in. to about 1 in. in thickness, depending on the loading requirements of the system. To this end, FIGS. 6A through 6E show various components that can be cut or otherwise fabricated to assemble a completed support plate similar to the plate 142 in FIGS. 5A-5B. Like reference numerals are used for similar components.

Figure 6A:
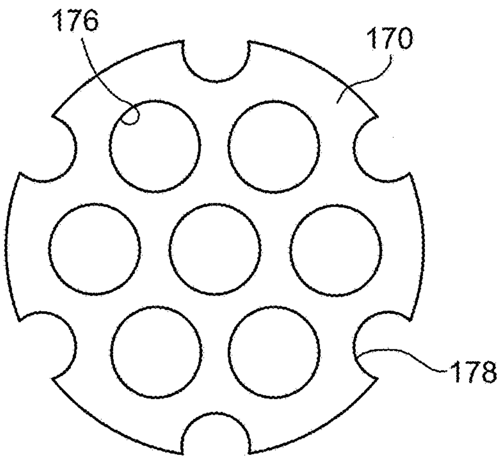
FIGS. 6A through 6E depict components of another storage pod support plate in some embodiments.
Figure 6C:
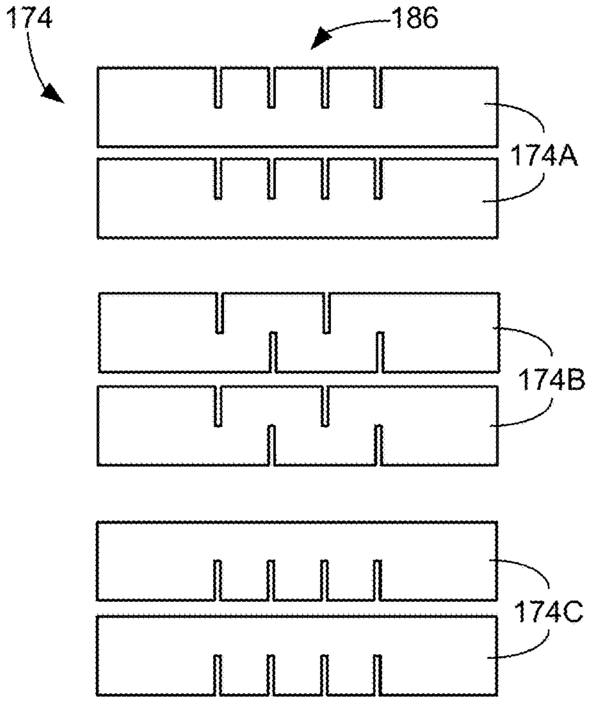
Figure 6B:
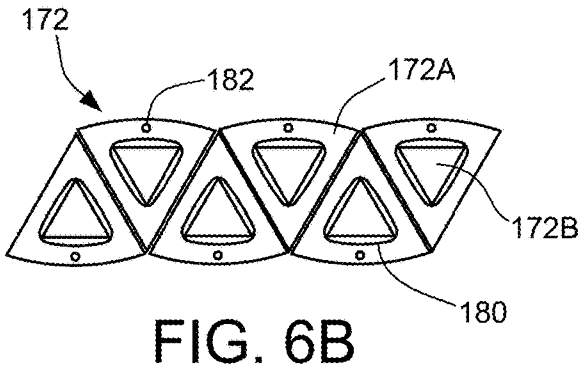

FIG. 6A shows the upper plate 170; FIG. 6B shows various triangularly shaped segments 172A, 172B that can be used to form the lower plate 172; and FIG. 6C shows the support flanges 174 to be made from various interlocking members respectively denoted in pairs as 174A, 174B and 174C. Notches 186 are formed in the respective interlocking members 174A, 174B and 714C as shown.

Figure 6E:
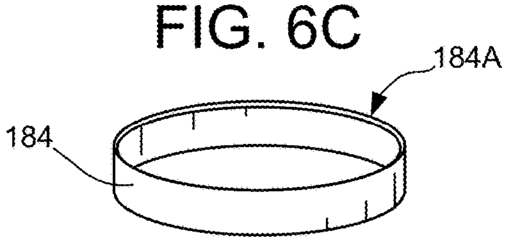
Figure 6D:
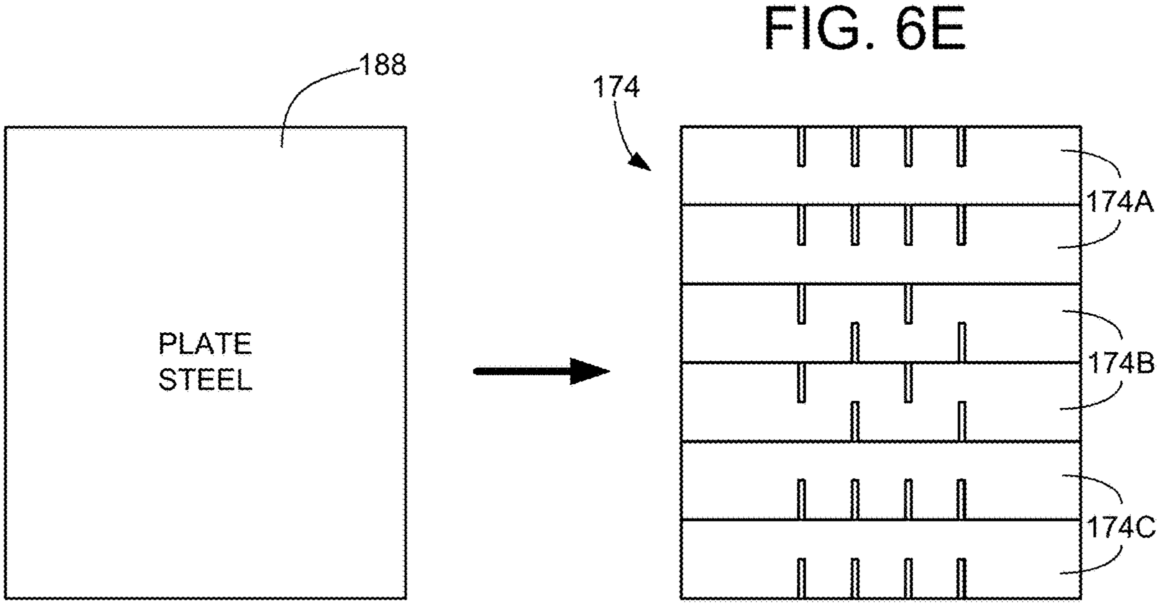

The elements in FIGS. 6A through 6C can be readily cut from one or more sheets of plate steel 188, such as shown in FIG. 6D for the interlocking members 174 in FIG. 6C. FIG. 6E shows the annular support bushing 184 from FIG. 6E. The bushing 184 can be cut from an elongated cylindrical member such as a section of casing. Secondary machining operations can be applied to the cut sections to form a chamfered top support surface 184A. The top support surface can take other configurations, such as flat, notched, grooved, etc.

Figure 7A:
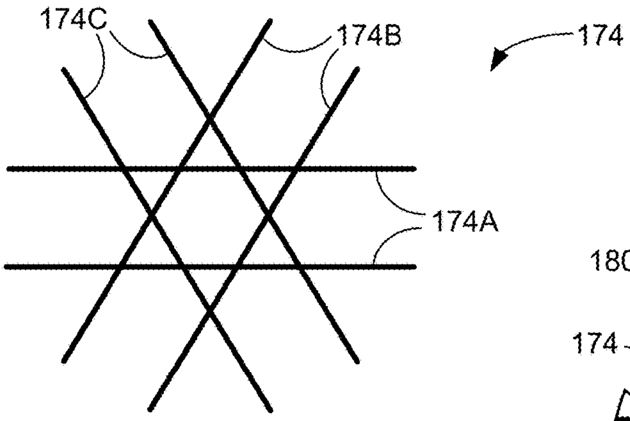
FIGS. 7A through 7D illustrate an assembly sequence to form the storage pod support plate of FIGS. 6A-6E.
Figure 7B:
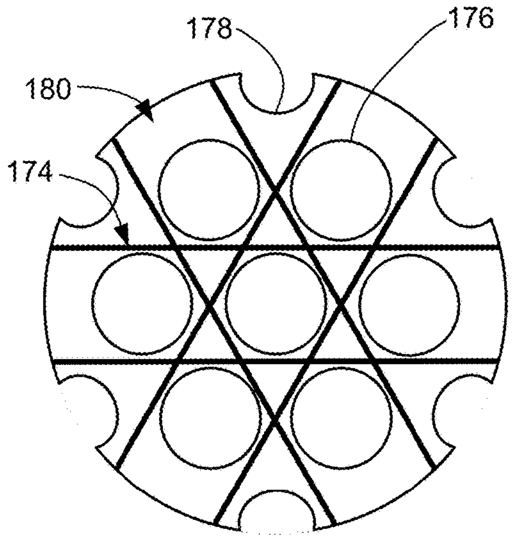

FIGS. 7A through 7D illustrate an assembly sequence that can be used to assemble a support plate from the various elements from FIGS. 6A-6E. The members 174A, 174B and 174C are interlocked using the notches 186 to form a star pattern as shown in FIG. 7A. The star pattern is thereafter attached to the underside of the upper plate 170 as shown in FIG. 7B so that the upper portions of the interlocking members 174 are brought into contacting engagement against the underside of the upper plate 170.

Attachment of the various elements of the support plate can be carried out using any suitable attachment mechanisms including welds, threaded fasteners, locking pins, etc. The members 174A, 174B and 174C intersect and pass adjacent the storage container openings 176 to allow sliding passage of the containers 144 therebetween.

While the star pattern shown in FIGS. 7A-7B is particularly suitable, other crossing patterns can be used to arrange the respective members in contacting relation one to another including a crosshatch pattern, a non-symmetric pattern, etc. A non-crossing pattern can also be used such that the members are parallel or otherwise in non-contacting relation one to another.

Figure 7C:
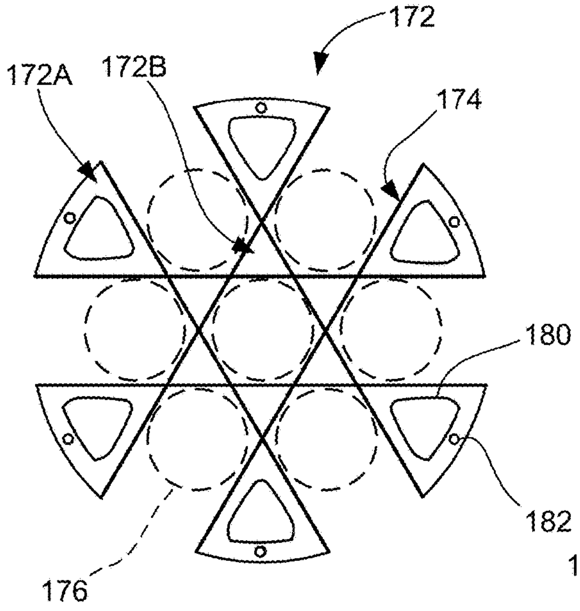
Figure 7D:
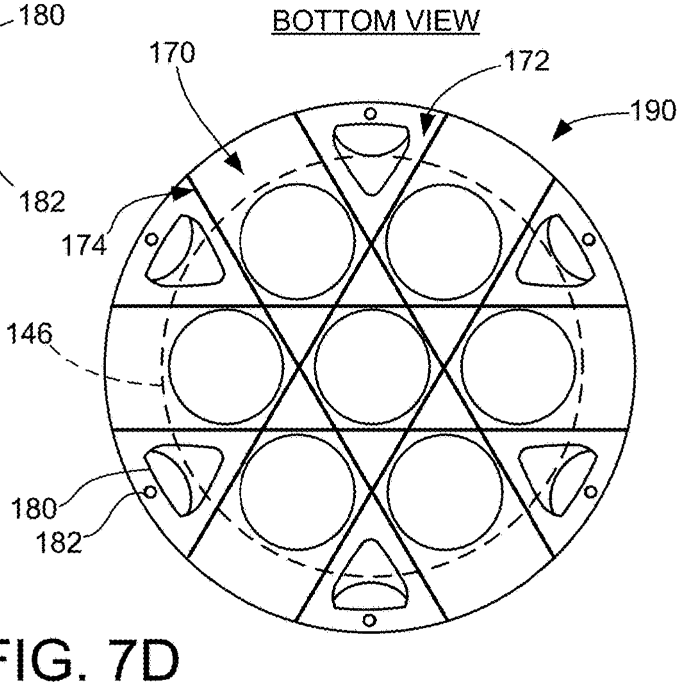

In still further embodiments, at least some or all of the notches can be eliminated, and the various members cut to length as individual pieces that are secured in an appropriate crossing or non-crossing pattern. For example, the members 174A could remain as shown in FIG. 7B (with or without the notches 186) and the members 174B and 174C cut to appropriate lengths to fit between and adjacent the members 174A to form substantially the same star pattern. In still other embodiments, the FIG. 7C shows the subsequent insertion and attachment of the various outer and inner triangular pieces 172A, 172B between the lower portions of the respective interlocking members 174A-174C. Once installed, the pieces 172A, 172B collectively form the lower plate 172. As before, a suitable attachment mechanism is used (welds, fasteners, etc.) to interconnect the pieces 172A, 172B to the respective interlocking members 174A-174C. A bottom view of a completed support plate 190 is shown in FIG. 7D.

It will be recalled from FIGS. 1A-1B that each of the respective containers 100, 110 have associated top cap assemblies 104, 114 that are slightly larger than the associated casings 102, 112. The top cap assemblies may take the form of flanges, collars, etc. While not necessarily required, using containers with top cap assemblies having an OD that is larger than the inner diameter (ID) of the openings 176 allows the containers 144 to be contactingly supported by the upper plate 170 of the support plate 142, 190 (with or without the use of an intervening bushing such as 184), and prevent inadvertent passage of the top portion of the storage containers through the plate and down into the bore.

In one non-limiting example, the top cap assemblies have an OD of about 16 in. and a casing OD of about 13 in. The storage container openings 176 in the upper plate 170 have an ID on the order of about 14 in. Other respective values can be used. While not shown, securement mechanisms in the form of brackets, straps, threaded fasteners, etc. can be used to secure the containers 144 to the upper support plate 170.

When welding is used to attach the various elements together to form the support plate 142, 190, the interlocking supports 174 can be welded the full thickness of the hanger for strength. Also, the triangular brace members 172A, 172B on the bottom portion of the support plate allow expanding gases to escape from the well bore such as in the event of a small leak, a larger rupture or even an explosion.

It is noted that the triangular configuration for the bracing elements 172A-172B was found to be lighter weight than a ladder type design with cross-struts, a solid plate with ventilation holes, etc. Nonetheless, these other alternative configurations for the lower plate 172 (e.g., plate design, ladder design, etc.) are contemplated for use in other embodiments.

Figure 8A:
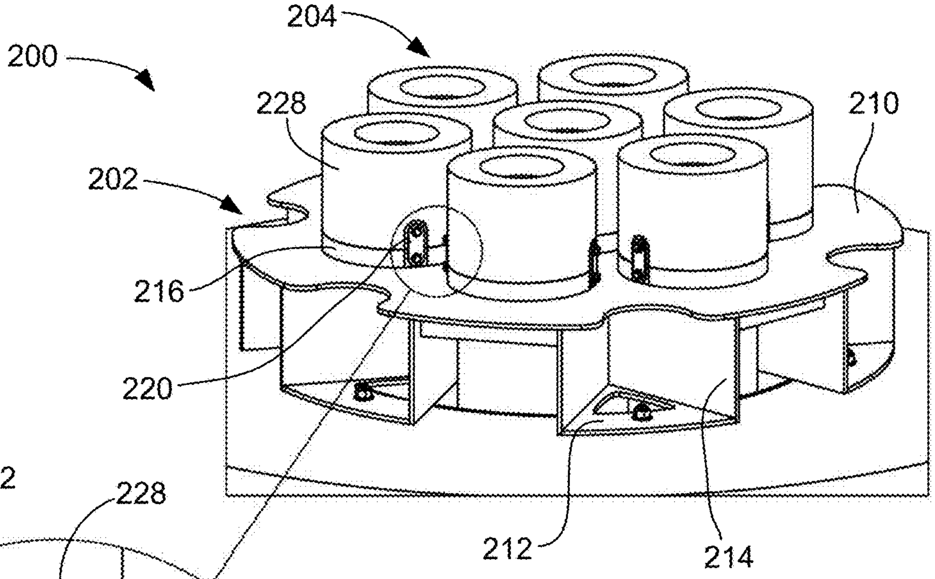
FIGS. 8A and 8B show a securement arrangement that can be used in some embodiments to secure storage containers to a support plate.
Figure 8A:
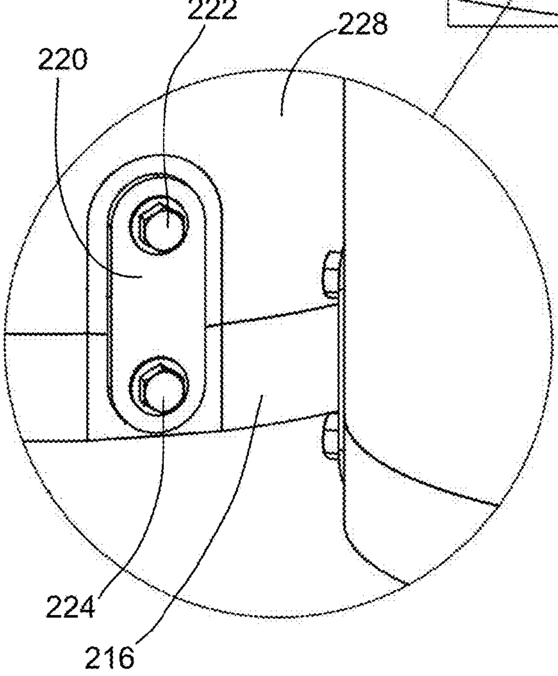
Figure 8B:
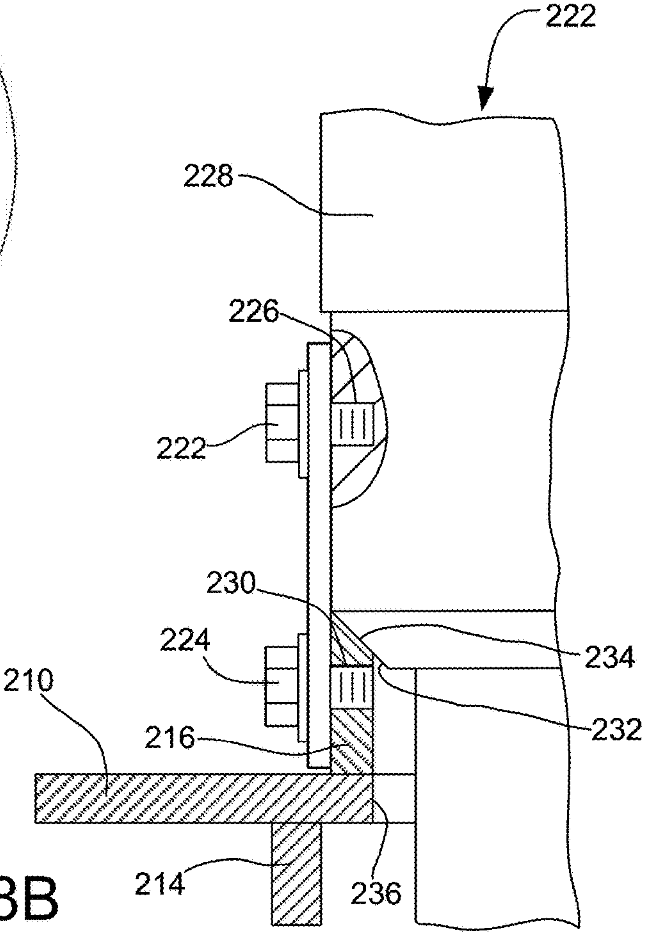

FIGS. 8A and 8B illustrate another storage pod 200 in accordance with further embodiments. The storage pod 200 is similar to the pod 140 discussed above and includes a support plate 202 and seven (7) storage containers 204. As before, the support plate 202 includes an upper plate 210, segmented lower plate 212, and interlocking support flanges 214. The support plate 202 also includes a chamfered annular bashing 216 similar to the bushing 184 in FIG. 6E.

At least one securement bracket 220 is used to secure each of the storage containers 204 to the support plate 202 using upper and lower threaded fasteners 222. 224. As best viewed in FIG. 8B, the upper threaded fastener 222 engages a threaded aperture 226 that extends into a collar 228 (top cover assembly) of the storage container 204. The lower threaded fastener 224 engages a corresponding threaded aperture 230 that extends through the side of the bushing 216. Corresponding chamfered surfaces 232, 234 of the collar 228 and the bushing 216 help to center and secure the storage container 204 within a storage container opening 236 through the upper plate 210.

Figure 9:
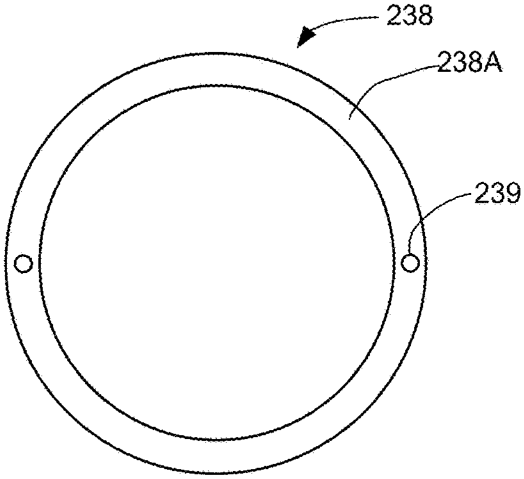
FIG. 9 depicts an annular bushing that can be used in a storage plate in further embodiments.

FIG. 9 shows a top plan view of another annular support bushing 238 that can be used in lieu of the annular bushings 184, 216 discussed above. The bushing 238 can be of any suitably rigid and incompressible material including metal, plastic, nylon, etc. The bushing 238 has a flat (horizontal) top support surface 238A and a pair of through hole apertures 239 to facilitate attachment.

Figure 10:
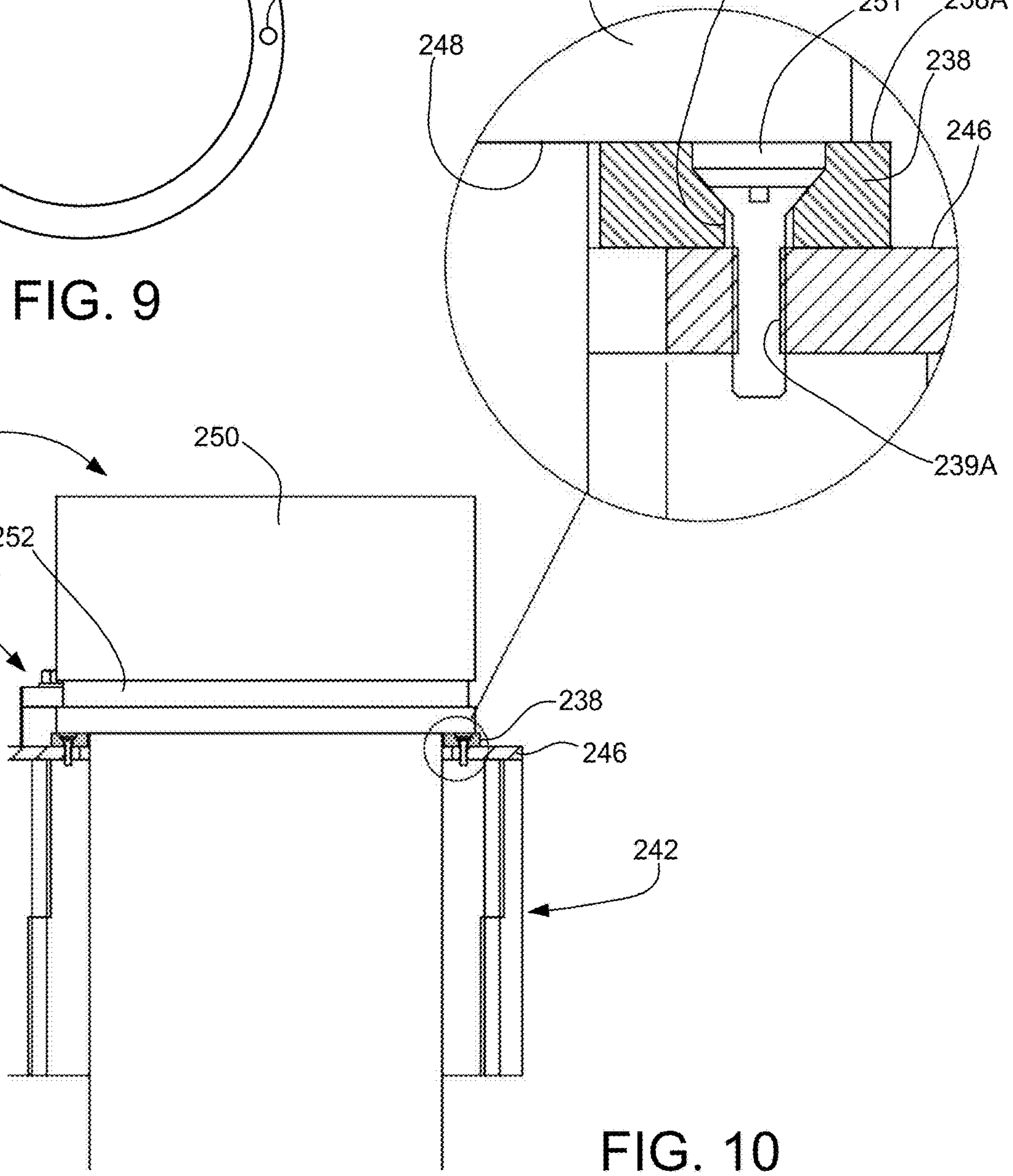
FIG. 10 depicts an installation configuration of the bushing of FIG. 9.

FIG. 10 shows aspects of another storage pod 240 similar to the storage pods 140, 200 discussed above and which utilizes the bushing 238 from FIG. 9. The storage pod 240 includes a support plate 242 to support a number of storage containers 244 as before. As best viewed in the close-up view in FIG. 10, the bushing 238 is interposed between an upper plate 246 of the support plate 242 and a lower facing surface 248 of a collar 250 of the storage container 244. The bushing 238 is secured to the upper plate 246 using a pair of threaded fasteners 251 that each pass through a corresponding bushing aperture 239 and engage threaded aperture 239A in the upper plate 246.

Additional features shown in FIG. 10 include an annular recess (groove) 252 in the collar 250. This groove 252 accommodates an attachment bracket 254 to secure the storage container 244 to the upper plate 246 of the support plate 242. In some embodiments, the bushing 238 can be color coded or otherwise configured to provide a visually detectable indicia of the type of gas stored in the associated container 244. For example, in one embodiment a first color may be used to identify a first gas (e.g., H2), a second color may be used to identify a second gas (e.g., CNG), and so on.

Figure 11:
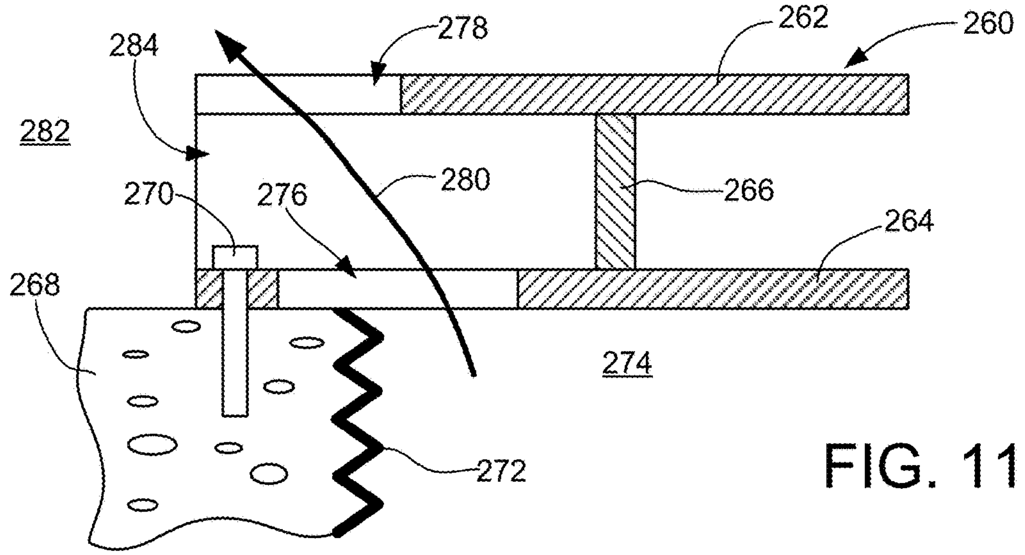
FIG. 11 is a cross-sectional, simplified elevational diagram of selected portions of a support plate in further embodiments.

FIG. 11 is a schematic cross-sectional representation of aspects of another support plate 260 in accordance with further embodiments. As before, the support plate 260 has an upper plate 262, a lower plate 264 and a support flange 266. It will be noted that, in each of the disclosed embodiments, the upper and lower plates have been depicted as being parallel and substantially horizontal, and the support flanges have been radially extending and substantially vertical. While this configuration is particularly suitable for suspending the storage containers in a substantially vertical orientation, other configurations are contemplated.

As before, the lower plate 264 is contactingly supported by and secured to a concrete pad 268 via a threaded fastener 270. A corrugated liner is shown at 272 to define an innermost sidewall of a bore 274. Vent apertures 276, 278 are formed in the respective lower plate 264 and the upper plate 262 to facilitate an airflow (arrow 280) from within the bore 274 to a surrounding environment 282.

More specifically, the airflow 280 is directed along a vent channel 284 bounded by respective portions of the upper and lower plates 262, 264 and the adjacent support flanges 266. The vent channel 284, also referred to as a vent baffle, is open at each end by the respective vent apertures 276, 278, and can be shaped as desired (including additional baffling elements along path 280 as required) to provide the desired flow rate characteristics between the interior of the bore 274 and the surrounding environment 282. It will be appreciated that the various upper and lower plate vent apertures described above (see e.g., apertures 178, 180 in FIGS. 5A-5B) provide a plurality of corresponding vent channels with parallel airflow paths through the support plate.

Those skilled in the art will recognize that, at sufficient depth, the interior temperature within the bore 274 may remain within a steady-state temperate zone (e.g., around 55 degrees F., etc.) irrespective of the environmental conditions above ground (e.g., environment 282). This provides a number of operational advantages including reduced fluctuations in pressure and other environmental effects as compared to above ground storage systems.

Figure 12:
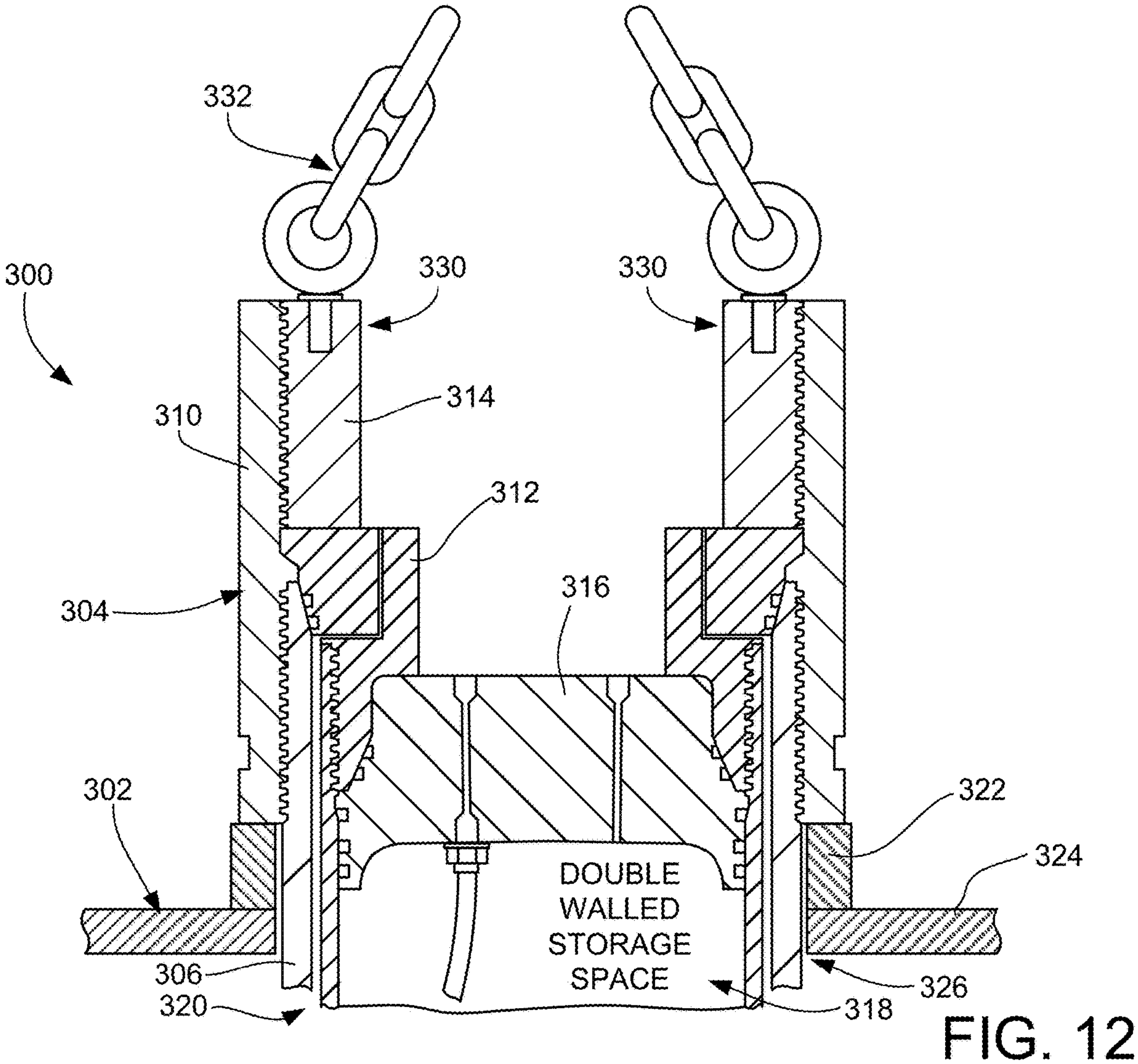
FIG. 12 shows further aspects of a storage container and the support plate in further embodiments.

FIG. 12 shows a cross-sectional representation of portions of another storage pod 300 in accordance with further embodiments. The pod 300 includes a support plate 302 and a container 304 which, as shown, is being installed onto the plate 302. The container 304 is a double-walled container with an outer casing 306 and an upper cap assembly 308. The upper cap assembly 308 is formed from an upper collar 310, gland nut 312, gland nut collar 314 and plug 316. This configuration provides an interior storage space 318 and annulus 320.

The upper collar 310 is brought into contacting abutment with a bushing 322 which extends upwardly from an upper plate 324 of the support plate 302 and surrounds a storage container aperture 326 through which the casing 306 extends. Attachment points 330 engage the upper cap assembly to enable a lifting mechanism 332, such as a chain, to raise and lower the container 304 through the opening 326 in the upper plate 324.

Figure 13A:
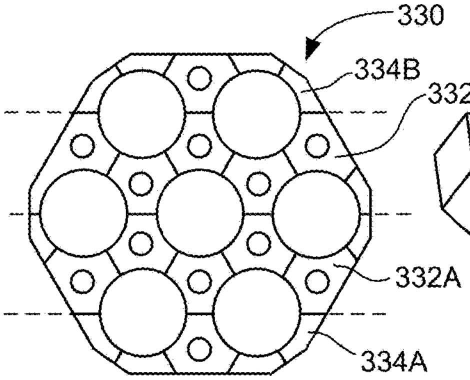
FIGS. 13A and 13B show another support plate assembly that can be used to support lower portions of the storage containers during shipment and use in accordance with further embodiments.
Figure 13B:
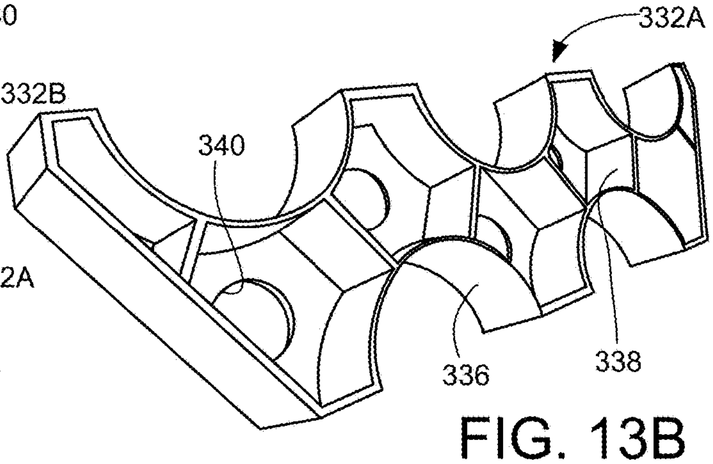

FIGS. 13A and 13B illustrate an intermediate support plate 330 that can be used during shipment and installation of a storage pod and/or the storage containers thereof. The support plate 330 supports the storage containers in the same pattern as used by the pod hanger support plate, such as the seven-member hexagonal arrangement used in the support plates 142, 190, 202, 240, 302 discussed above. The intermediate support plate 330 is used to provide temporary mechanical support and bracing at one or more intermediate locations of the containers until such time that the containers are ready to be lowered into the storage pod as discussed in FIG. 12.

The exemplary support plate 330 in FIG. 13A is formed of mirrored, segmented interior pieces 332A, 332B and mirrored, segmented end pieces 334A, 334B. A perspective view of the segmented interior piece 332A is shown in FIG. 13B. Each piece has a series of interior annular sidewalls 336 to contactingly support the casings of the respective containers, strengthening ribs 338, and apertures 340. The apertures 340 reduce weight, enhance venting as required, etc.

Figure 14:
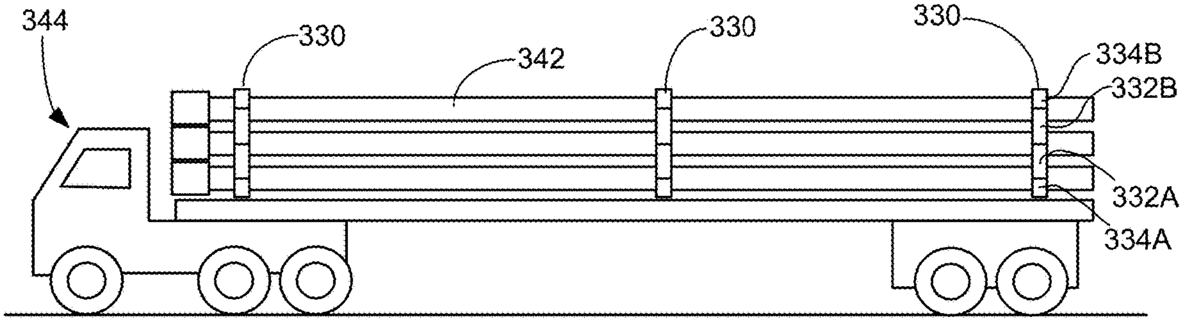
FIG. 14 represents transportation of a storage pod using the support plates of FIGS. 13A-13B in some embodiments.

As shown in FIG. 14, the support plate 330 is particularly suitable for supporting a population of storage containers 342 during transport using a flat-bed tractor trailer rig 344 or other vehicle. In this case, three (3) support plates 330 are provided as temporary mechanisms to support the containers 342 while the containers are oriented in a horizontal position for transport. Any number and placement of the support plates 330 can be used.

Figure 15:
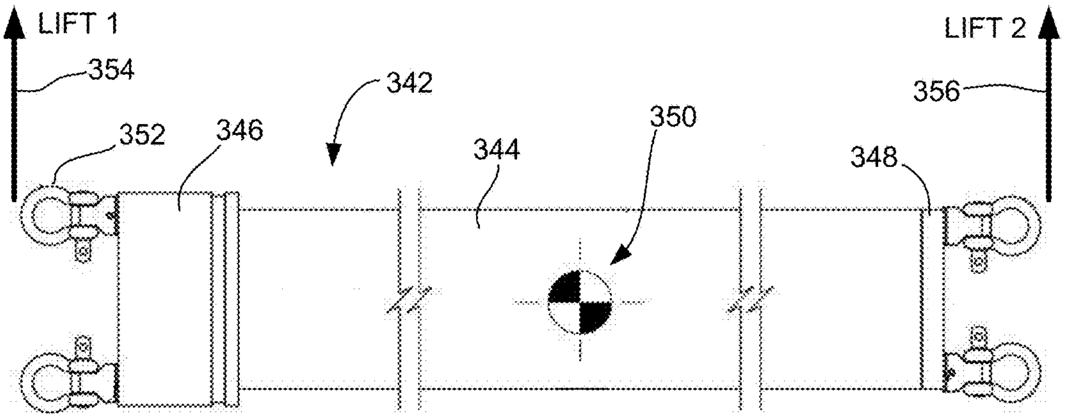
FIG. 15 illustrates the use of support mechanisms that can be installed at opposing ends of a storage container during installation.

FIG. 15 is a sectioned diagram of a selected storage container 342 from FIG. 14. The container 342 includes a cylindrical casing 344 with top cap assembly 346 and bottom cap assembly 348. A center of gravity for the container 342 is shown at 350.

Attachment points in the form of attachable shackles 352 can be temporarily affixed to both the top and bottom cap assemblies 346, 348 as discussed above in FIG. 12. In this way, once the associated portions of the intermediate support plates 330 have been removed (e.g., top end piece 334B, etc.), the container 342 can be lifted from each end as denoted by lifting vector arrows 354, 356 (Lift 1 and Lift 2). Suitable lifting mechanisms, such as the chains 332 shown in FIG. 12, can be affixed to the shackles 352 to provide these lifting forces.

Figure 16:
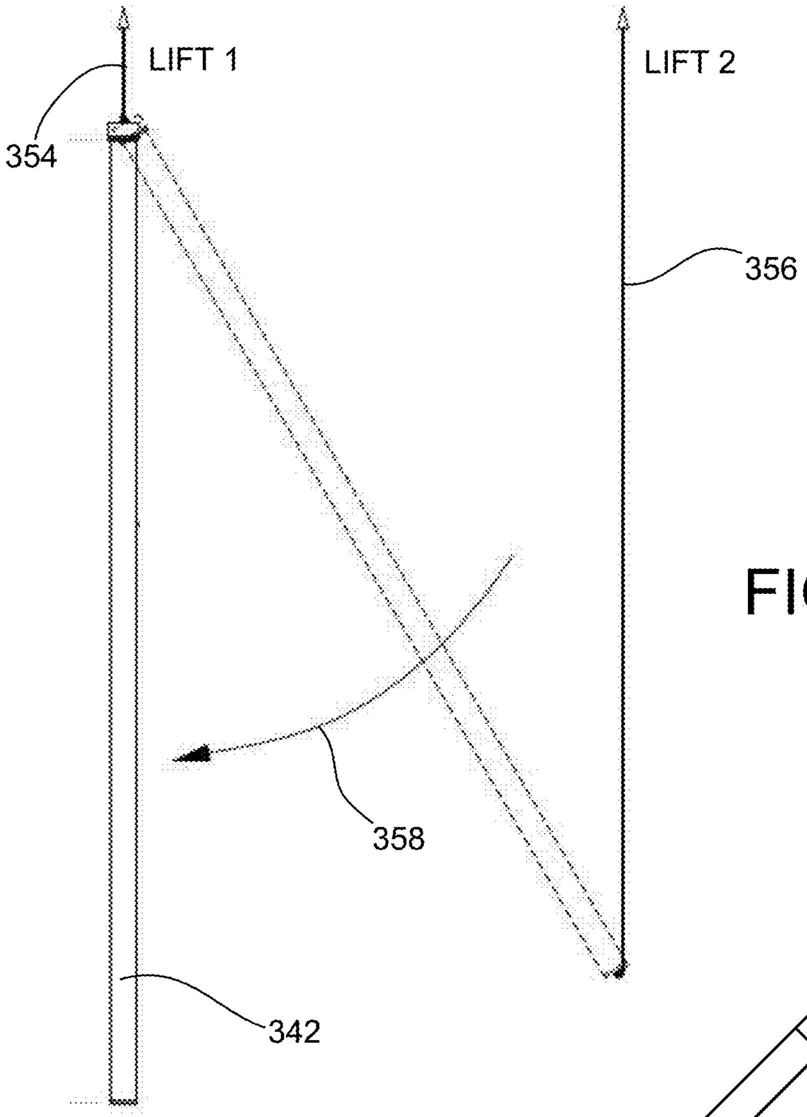
FIG. 16 depicts a lifting sequence using the support mechanisms from FIG. 15.
Figure 17:
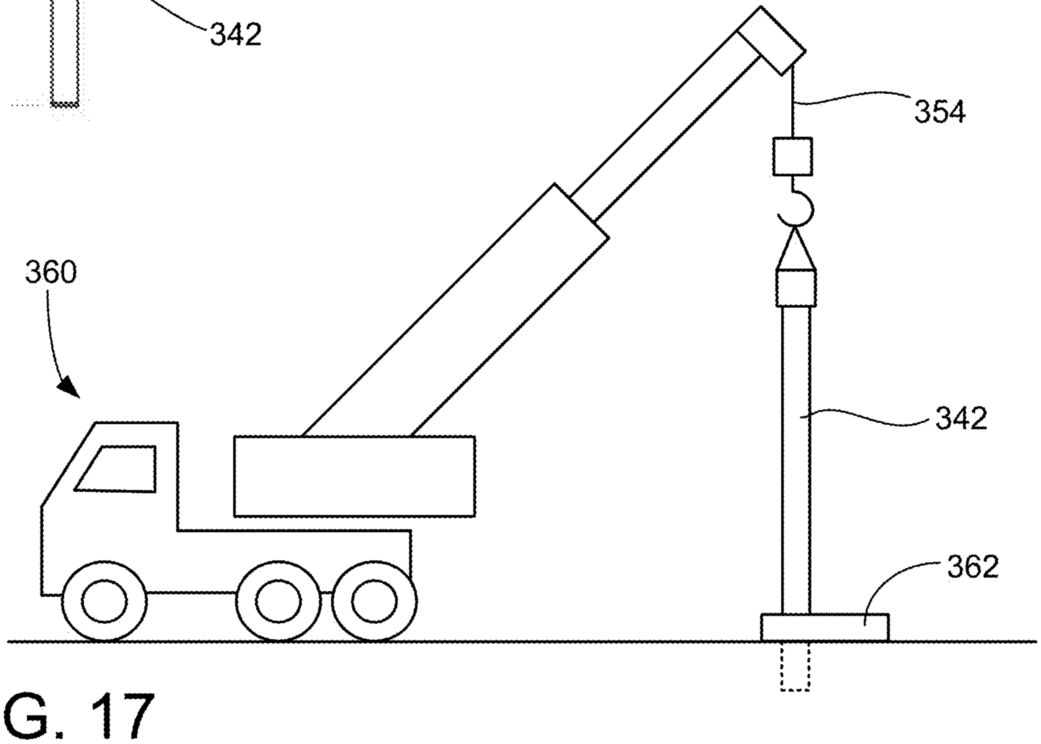
FIG. 17 depicts a crane assembly that can be used during installation and removal of the storage containers in different embodiments.

As shown by FIG. 16, as the container 342 is raised from the vehicle 344, the chain supplying lifting force 356 (Lift 2) can be gradually lengthened to controllably transition the suspended storage container 342 from horizontal to vertical along arcuate path 358. The lifting forces 354, 356 can be supplied by one or more crane rigs 360, as shown in FIG. 17. Once the container 342 is fully vertical, the container can be lowered through a support plate 362 as shown.

In an alternative embodiment, one or more intermediate support plates 330 can be installed and remain in place, so that the storage pod is fully assembled, shipped and installed as a unit, including the placement of the intermediate support plate(s) 330 into the well bore. This arrangement generally precludes the ability subsequently remove the storage containers on an individual basis as in FIG. 17, but provides other advantages such as pre-installation certification and testing of the entire storage pod.

This latter arrangement is referred to as a "Full Bore and Removable" design, which allows the storage pod to be fully assembled and shipped to an existing "built for purpose" inspection facility where larger and more sophisticated equipment capable of detecting smaller material defects may be used. This is especially true for hydrogen embrittlement applications. Such inspections can be easily and efficiently carried out with this design.

Figure 18:
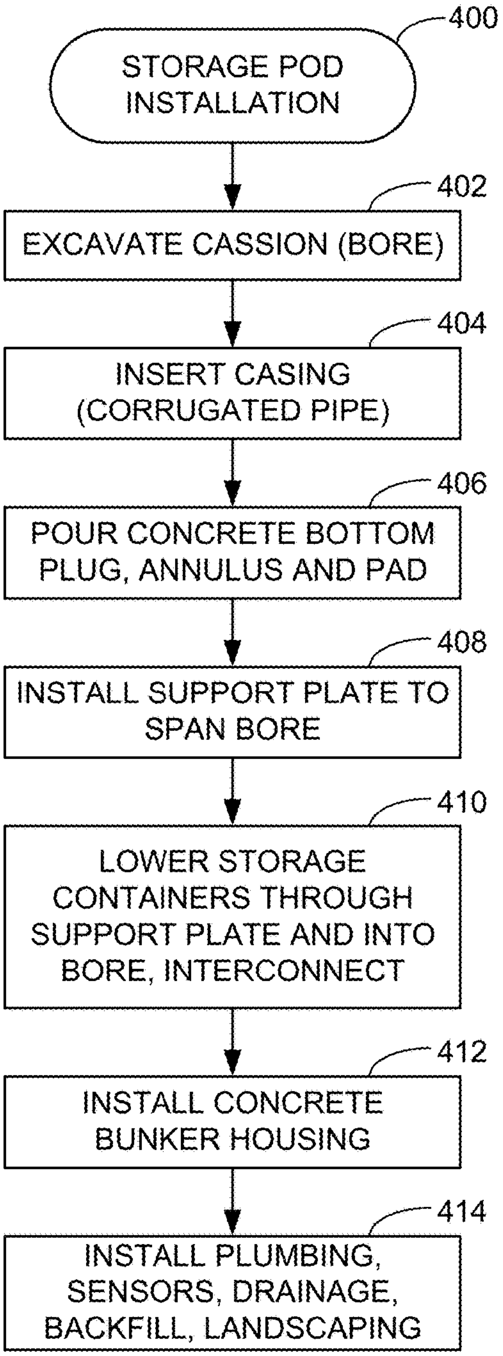
FIG. 18 is a flow chart for a storage pod installation routine illustrative of steps carried out in accordance with some embodiments to install a subterranean storage system.
Figure 19:
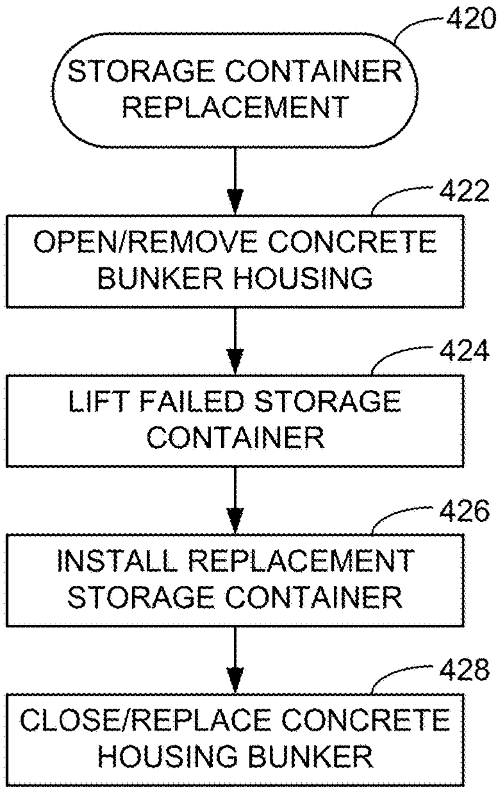
FIG. 19 is a flow chart for a storage container replacement routine illustrative of steps carried out in accordance with some embodiments to remove and replace an individual storage container from the pod.
Figure 20:
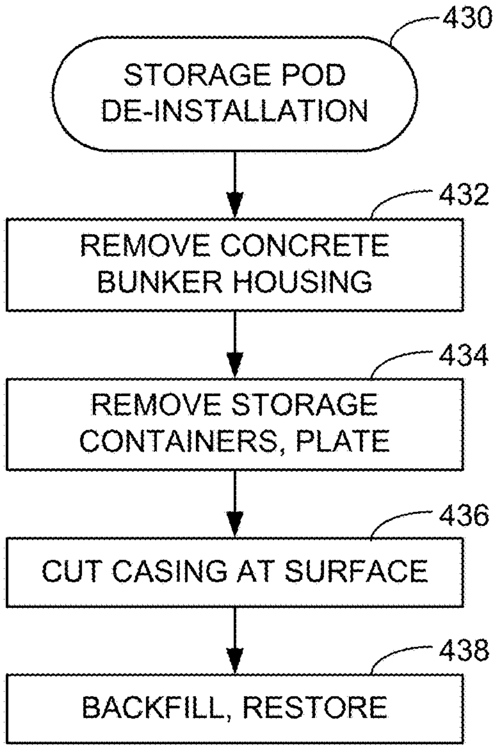
FIG. 20 is a flow chart for a storage pod de-installation routine illustrative of steps carried out in accordance with some embodiments to remove the subterranean storage system and remediate the site.

FIGS. 18, 19 and 20 show respective methods that can be carried out to install a storage array (pod), to replace individual storage containers, and to de-install and remediate a site to restore such to its original condition. These methods are merely exemplary and are not limiting, so that other steps may be used as required. It is contemplated that the methods set forth in FIGS. 18-20 are for an "On-Site Installation" design where the containers and support plates are separately transported to the installation site and the storage pods are assembled on-site. Full Bore and Removable pod designs can be handled similarly as noted herein.

FIG. 18 provides a storage pod installation routine 400 that includes a number of initial site preparation steps. These include excavating the bore (caisson) to the appropriate depth at step 402; inserting a casing such as a corrugated pipe or other conduit at step 404; and pouring concrete into the bore to form the sidewalls (annulus), bottom plug and pad, step 406.

A support plate such as those described above including 142, 190, 202, 242, 302 and/or 362 is installed over the opening of the bore at step 408 using suitable fasteners or other securement mechanisms. Each of a number of storage containers are successively lowered through the support plate and into the bore at step 410. A suitable concrete bunker or other housing is installed at step 412; and various instrumentation and control elements are installed at step 414 as well as other plumbing, backfill and landscaping to complete the site installation.

As noted above, a number of storage pods may be installed to form a larger storage pod, in which case the foregoing steps are carried out in turn for each storage pod, and additional interconnections and equipment installations are carried out to interconnect the storage pods into a larger storage array.

FIG. 19 shows a storage container replacement routine 420 in which a particular storage container is to be removed and replaced. This may be carried out for a number of reasons including damage, failure, upgrade, etc. For example, it may be desirable in some cases to replace a single walled container with a double walled container or vice versa.

The container replacement routine 420 proceeds by opening or otherwise removing an existing bunker housing at step 422 to provide access to the storage pod. The container that has failed or is otherwise to be removed is disconnected from the system and lifted out of the support plate at step 424. This may entail various operations described above including unbolting of the container from the plate, attachment of one or more attachment points, etc.

It is noted that if a two-point lifting technique is to be used (see FIGS. 15-16), then lower attachment points may be attached to the bottom cap assembly as the container clears the support plate to enable the removed container to be transitioned to a horizontal position on a transport vehicle.

A replacement container is installed at step 426 using the various steps in FIG. 18, and the bunker housing is reinstalled at step 428 to complete the replacement operation.

FIG. 20 shows a storage pod-deinstallation routine 430. This routine remediates a site to its former state to the extent practicable. The bunker housing is removed at step 432, followed by steps of removing the storage containers and the support plate at 434, cutting off of the casing at the surface at 436, and backfilling and restoring the site at 438. It may not be possible to fully excavate the entirety of the concrete lined well bore, although this can be carried out as required. Rather, it is contemplated that the pad, liner and sidewalls can be removed down to a suitable depth, such as 6-10 ft or more, after which the bore and surrounding surface can be filled, leveled, planted with vegetation, etc.

The various embodiments disclosed herein enable these and other operations to be carried out effectively and efficiently. With regard to site remediation (e.g., returning the site to a restored condition comparable to its original state prior to installation), many jurisdictions regulate the cut-off depth for the subterranean corrugated pipe and cement shaft elements. These must be cut off at or below a specified depth. The various embodiments easily allow the system to be fully compliant with these and all other regulatory requirements concerning installation, operation, removal, and site remediation.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A subsurface gas storage system, comprising:

a pod hanger support plate configured to span an opening of a well bore that extends into a subsurface formation, the pod hanger support plate comprising:

an upper plate having a plurality of storage container apertures extending therethrough;

a lower plate configured to be contactingly supported by a pad through which the well bore extends; and at least one support flange extending between and interconnecting the upper plate to the lower plate; and a plurality of elongated gas storage containers supported by the pod hanger support plate to extend through the storage container apertures and into the well bore.

2. The system of claim 1, wherein the pod hanger support plate further comprises at least one vent channel bounded by respective portions of the upper plate, the lower plate and the at least one support flange to establish an airflow path between an interior of the well bore and a surrounding environment, the at least one vent channel open via an upper plate vent aperture in the upper plate and a lower plate vent aperture in the lower plate.

3. The system of claim 2, wherein the pod hanger support plate further comprises a plurality of vent channels aligned with a plurality of lower plate vent apertures in the lower plate and a plurality of upper plate vent apertures in the upper plate to accommodate a plurality of airflow paths through the pod hanger support plate between the interior of the well bore and the surrounding environment.

4. The system of claim 1, wherein the upper plate comprises a continuous web of material having a uniform thickness through which the storage container apertures extend.

5. The system of claim 4, wherein the lower plate is segmented into a plurality of discontinuous pieces arranged between and connected to adjacent ones of the at least one support flange.

6. The system of claim 5, wherein each of the discontinuous pieces is substantially triangular in shape to extend between and contactingly brace a pair of adjacent ones of the at least one support flange.

7. The system of claim 1, wherein the at least one support flange comprises a plurality of elongated members which extend between at least one adjacent pair of the storage container apertures in the upper plate.

8. The system of claim 7, wherein the elongated members are arranged in contacting relation to one another in a crossing pattern across an underside of the upper plate.

9. The system of claim 8, wherein the elongated members comprise notches to facilitate an interlocking arrangement of the elongated members in a star pattern.

10. The system of claim 1, wherein the lower plate comprises a continuous layer of material that spans an areal extent of the upper plate.

11. The system of claim 1, further comprising a plurality of annular support bushings affixed to the upper plate, each annular support bushing surrounding a corresponding one of the storage container apertures.

12. The system of claim 1, further comprising an intermediate support flange that interconnects a medial portion of each of the storage containers at a position distal to the support flange.

13. The system of claim 1, wherein each of the upper plate, the lower plate and the at least one support flange are cut from at least one sheet of plate steel, and each have a thickness of from about 0.5 inches to about 1.0 inch.

14. The system of claim 1, further comprising a securement mechanism that affixes each of the storage containers to the upper plate.

15. The system of claim 1, wherein each storage container comprises a casing, a top cap assembly at a first end of the casing and a bottom cap assembly at a second end of the casing, wherein the casing and the bottom cap assembly are sized to pass through a corresponding one of the storage container apertures, and a securement bracket affixes the storage container to the pod hanger support plate so that the top cap assembly remains adjacent or above the upper plate.

16. The system of claim 15, wherein the top cap assembly has an outermost diameter (OD) that is greater than an inner diameter (ID) of each of the storage container apertures to prevent passage of the top cap assembly through the upper plate.

17. A subsurface storage pod configured to store a volume of pressurized gas within a subsurface well bore, the subsurface storage pod comprising:

a pod hanger support plate comprising an upper plate, a lower plate and plurality of support flanges extending therebetween in a C-beam or I-beam configuration, the upper plate comprising at least one vent aperture to facilitate an airflow therethrough, the pod hanger support plate configured to be supported by and span a support pad that surrounds the well bore; and a plurality of storage containers supported by and secured to the upper plate for extension adjacent the support flanges and lower plate into the well bore.

18. The storage pod of claim 17, further comprising a plurality of annular support bushings connected to the upper plate each surrounding a corresponding one of the storage container apertures, each annular support bushing having a chamfered top surface to contactingly engage a corresponding lower chamfered surface of an associated one of the plurality of storage containers to center the associated one of the plurality of storage containers within the corresponding one of the storage container apertures.

19. The storage pod of claim 17, wherein the plurality of support flanges comprise interlocking members that are arranged in a crossing pattern and affixed to an underside of the upper plate, and wherein the lower plate comprises a plurality of discontinuous sections that are interconnected between adjacent pairs of the interlocking members.

20. The storage pod of claim 17, wherein the storage pod stores at least a selected one of hydrogen (H2) or compressed natural gas (CNG) at one or more desired storage pressures.

* * * * *